Nov. 5, 1968  J. DUFAULT  3,408,813

HYDRAULIC SAFETY VALVE

Filed Oct. 28, 1966  2 Sheets-Sheet 1

INVENTOR.
JACK DUFAULT

BY *Harris M. Isaacson*

ATTORNEY

Nov. 5, 1968   J. DUFAULT   3,408,813
HYDRAULIC SAFETY VALVE
Filed Oct. 28, 1966   2 Sheets-Sheet 2
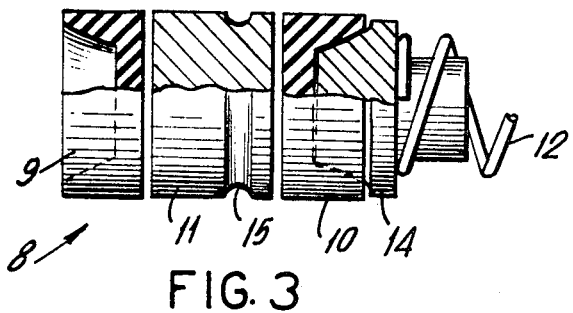
FIG. 3
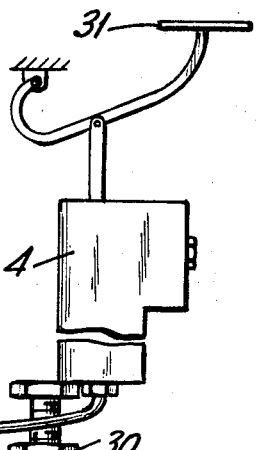
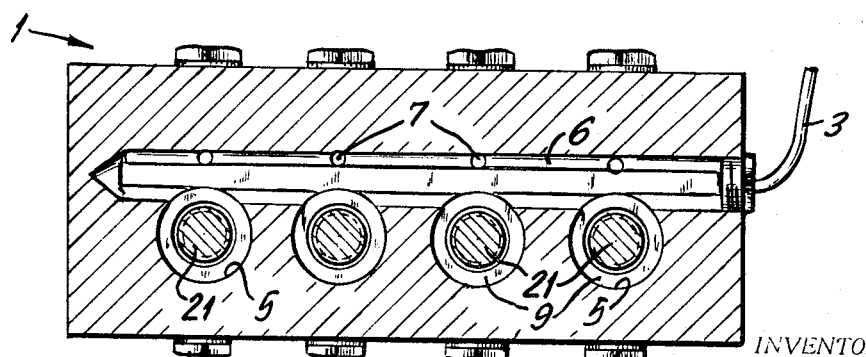
FIG. 4
FIG. 5
INVENTOR.
JACK DUFAULT
BY Harris M. Isaacson
ATTORNEY

United States Patent Office 3,408,813
Patented Nov. 5, 1968

3,408,813
HYDRAULIC SAFETY VALVE
Jack Dufault, Ferry Road, Lewiston, Maine 04240
Filed Oct. 28, 1966, Ser. No. 590,254
4 Claims. (Cl. 60—54.5)

ABSTRACT OF THE DISCLOSURE

The present invention provides a safety valve system adaptable for use with existing hydraulic systems generally including a block adapted to be joined with the master cylinder, the block having a plurality of passages, each passage having a corresponding valving chamber with a valving piston in each chamber adapted to act upon damage to a braking conduit and a by-pass chamber connecting the passage with its respective valving chamber.

---

The present invention relates to a safety valve system for use with a hydraulic system with particular emphasis on a hydraulic braking system such as found in vehicles.

Many devices including vehicles, heavy construction equipment and machines rely upon hydraulic systems especially in their respective braking apparatus. These systems generally employ the use of a substantially non-compressible liquid encased in a master cylinder, and upon actuation of the master cylinder, the liquid is forced through conduits to actuate, for example, braking shoes into braking contact with braking drums. As stated, the most commonly known apparatus is the braking system of an automobile and while the system herein described is considered specifically in connection with a vehicular braking system, it is to be understood that the invention has applications in all hydraulic systems.

In the case of, for example, a vehicle having a four wheel braking system, conduits radiate from the master cylinder to each of the four wheels. If a break or leak developed in any of the four conduits, braking would be impossible or severely hampered on any of the other three brakes since the fluid flowing from the damaged conduit would destroy the pressure that would otherwise emanate from the master cylinder.

Many safety devices have been designed in the past to provide a by-pass to the damaged conduit or otherwise seal off fluid to the damaged conduit however, such devices generally employed a redesigning of the master cylinder itself so as to accommodate the safety device thereby making those devices generally unacceptable for then existing vehicles without redesign of the master cylinder housing. Additionally, the devices of the past were not adjustable without substantial rebuilding of the device.

In many instances, where the safety devices of the past became actuated, they sealed off the defective conduit in such a manner that fluid from the sealed off system could not return to the master cylinder fluid flow thereby necessitating "pumping" of the brakes in order to get enough fluid pressure into the remaining conduits.

Additionally systems of the past made no provision for fluid expansion within the safety system and fouling could occur due to changes in temperature by fluid expansion.

The present invention provides a safety valve system which is readily adaptable for use with existing hydraulic systems and can control any given number of wheel arrangements, yet is still operated by hydraulic pressure from the present master cylinder, and provides means for not only isolating and sealing off the defective conduit, but allows for the return flow of fluid into the master cylinder in the event of fluid expansion.

Specifically, the present invention includes a block or housing adapted to be joined with the master cylinder, the block having a plurality of passages, each passage having a corresponding valving chamber, a valving piston in each chamber adapted to act upon damage to a braking conduit and a by-pass chamber connecting the passage with its respective valving chamber.

Although such novel feature or features believed to be characteristic of the invention are pointed out in the claims, the invention and the manner in which it may be carried out may be further understood by reference to the description following and the accompanying drawings.

FIG. 3 is a plan view in detail of the piston member of the present invention, partially in section.

FIG. 4 is an elevation view partly in section showing the details to an enlarged scale of the safety device of the present invention with the piston in operative position.

FIG. 5 is a section taken along lines 5—5 of FIG. 1.

Referring now to the figures in greater detail, where like reference numbers denote like parts in the various figures.

Figure 1:
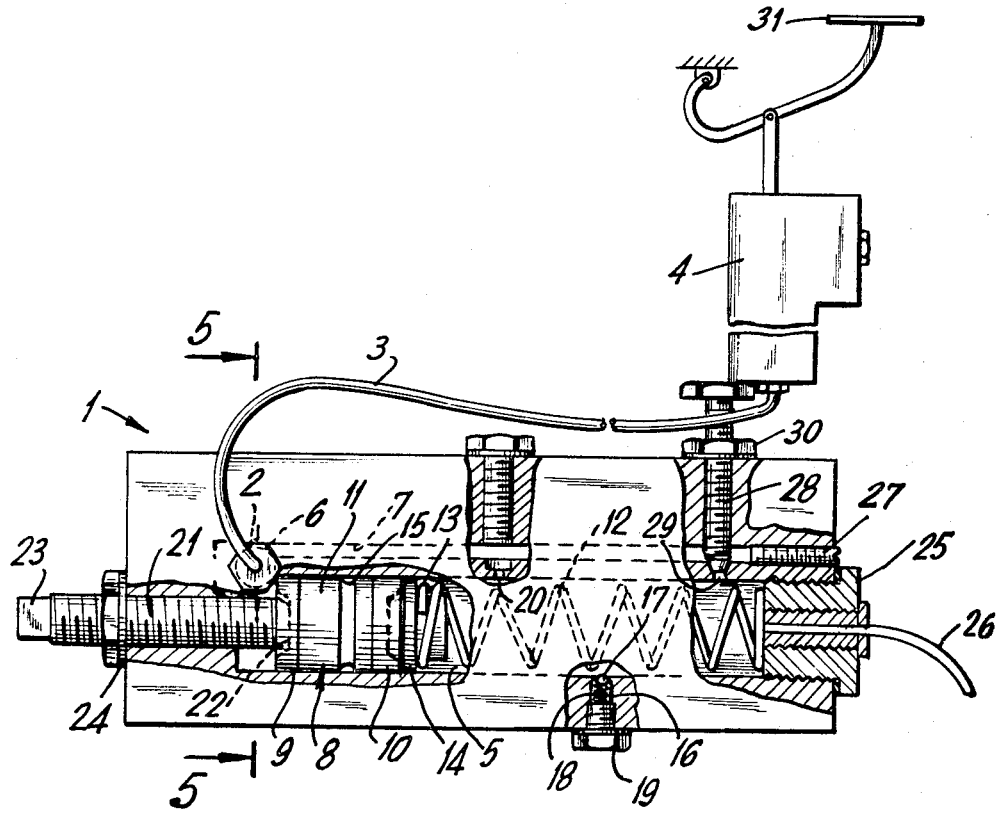
FIG. 1 is an elevational view partly in section showing the details to an enlarged scale of the safety device of the present invention.

As shown in FIG. 1, wherein the safety valve system is enlarged for clarity, the safety device of the present invention includes a block 1, having an opening 2 along one of its sides to receive conduit 3 which emanates from a conventional master cylinder 4.

Figure 2:
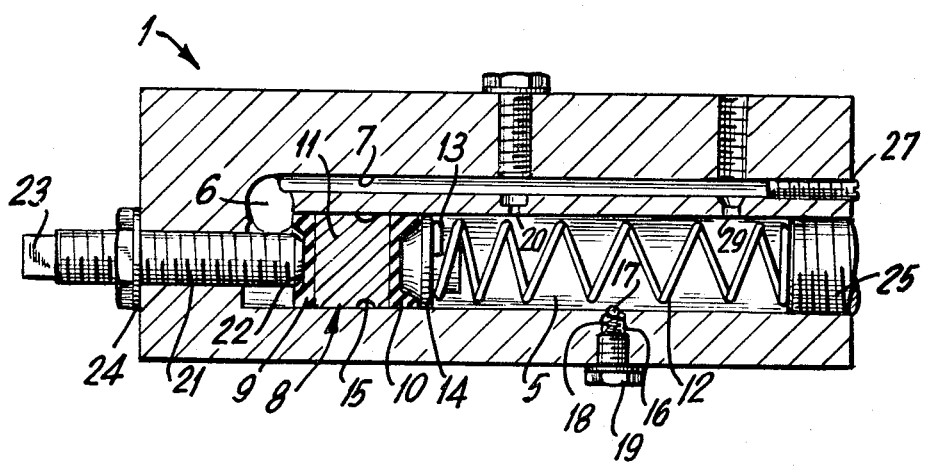
FIG. 2 is a sectional detail of FIG. 1 with the connecting conduits omitted.

The block 1 includes a longitudinal boring 5 open on both ends, a transverse boring 6, best shown in FIG. 2 beginning at opening 2 and extending inward into the block 1 and a longitudinal passage 7 beginning along a predetermined point on transverse boring 6 and extending above and parallel to longitudinal boring 5. Boring 5 similarly intersects passage 7 at a right angle.

Piston 8 is located within longitudinal boring 5 and comprises cups 9 and 10 respectively and spacer 11 located between cups 9 and 10. The outward faces of cups 9 and 10 are substantially U-shaped and are constructed of shock absorbing material such as hard rubber, plastic or the like. The spacer 11 is preferably of a metallic substance and constructed so as to be of the same general circumferential shape of, but slightly smaller than, longitudinal boring 5. The spacer 11 is provided with a circumferential groove 15 along part of its length.

A spring 12 is located within longitudinal boring 5 and extends from one open end thereof part way along the length of boring 5. At the inward end 13 of spring 12 is affixed bumper 14 which is shaped to abut with the U-shaped portion of cup 10.

A vertical channel 16 preferably threaded originates on the underside of block 1 and intersects longitudinal boring 5 at a right angle at a point along the length of boring 5. Set into vertical channel 16 is a steel ball 17, the steel ball 17 being maintained within vertical channel 16 by spring 18 and is so positioned that a portion of ball 17 extends into longitudinal boring 5. Adjustability of the height of ball 17 is provided by affixing spring 18 to a seal plug or bolt 19 which is threaded to mate with threads in vertical channel 16.

A narrow depending channel 20 begins at a point along longitudinal passage 7 and interconnects the same with longitudinal boring 5 and provides a bleed back into the master cylinder of fluid in the event of fluid expansion.

Threaded pin 21 is provided so as to seal off one end of longitudinal boring 5, with the inward end 22 of pin 21 adapted to abut the U-shaped portion of cup 9 and the outward end 23 of pin 21 is preferably shaped so as to be adaptable for turning with a wrench or the like. A seal washer 24 or the like is preferably provided in conjunction with pin 21 so as to seal off against fluid loss the end of boring 5.

The opposite end of boring 5 is provided with a fitting 25 used to affix the conduit line 26, which leads to a single braking mechanism, to the block 1.

Plug 27 preferably threaded is provided at the open end of longitudinal passage 7 and provides means in conjunction with seal plug 28 for loading and air bleeding the present invention. In order to allow for easier loading and bleeding of air, a channel 29 can be provided below seal plug 28 interconnecting longitudinal passage 7 and boring 5 for loading which channel 29 is sealed off by seal plug 28 after loading. A seal nut 30 can be provided with seal plug 28.

As shown in FIG. 5, a plurality of safety valves can be provided in the single block 1 depending upon the number of braking wheels in the vehicle.

In operation, fluid is loaded into the present system and the braking system of the vehicle and air is then bled out of the brake line by means known in the art.

During normal operation, a driver depresses brake pedal 31 which is connected to master cylinder 4 forcing fluid through conduit 3 into block 1. The fluid pressure acting upon cup 9 moves the piston 8 within boring 5 part way along its length. The fluid pressure is passed through conduit 26 to the braking mechanism to actuate the brakes of the vehicle. The spring 12 will return the piston 8 by pressure on bumper 14 upon release of the brake pedal 31.

In the event of damage to conduit 26, the absence of fluid pressure will cause piston 8 to traverse the entire length of boring 5. Upon the passage of piston 8 over steel ball 17, steel ball 17 will engage groove 15 on the spacer 11 of the piston 8 and lock piston 8 in fixed position at the end of boring 5 thereby blocking off the damaged conduit 26 and sealing off the loss of fluid from block 1.

The remaining brakes of the vehicle would remain operable and fluid pressure maintained. While the boring 5 is shown as being individually connected to a single conduit 26 it is readily apparent that conduits for pairs of brakes (not shown) can be provided such as for both front wheels or both back wheels so that in the event of damage to one of said pairs would cause piston 8 to seal off fluid to both of the conduits.

When in operable locked position as shown in FIG. 4, piston 8 bypasses depending channel 20 and loss of fluid through channel 20 is likewise avoided.

The block 1 can be provided with any given number of valve chambers so as to be usable with varied braking systems presently employed and since the block 1 is compact and separable from the master cylinder 4 redesigning of master cylinder housings or body chassis is unnecessary.

Additionally, adjustments can be made with regard to piston 8 positioning where needed, such as to compensate for spring 12 wear or changing viscosity of the fluid by adjusting pin 21 without the necessity of disassembling the block 1. In like manner, in the event of damage to one conduit 26 repair can be made to the safety valve of the present invention within the longitudinal boring 5 without the removal of the entire block 1.

A plurality of blocks 1 can be provided in lieu of a single block so that a selective number of valves can be positioned in proximity with the braking mechanisms themselves rather than having all of the safety valves within a single block. This would add a further safety factor in that damage to the vehicle itself rather then the conduit 26 in the area of the block 1 would not entirely render the system of the present invention inoperable.

The terms and expressions which are employed are used as terms of description; it is recognized, though that various modifications are possible within the scope of the invention claimed.

Having thus described certain forms of the invention in some detail, what is claimed is:

1. A safety valve system for use with a hydraulic system comprising a block separably affixed to a master cylinder at a point on said block, a transverse boring in said block beginning at said point and extending inward of said block, a plurality of longitudinal borings in said blocks intersecting said transverse boring at predetermined points along said transverse boring, a plurality of longitudinal passages intersecting said transverse boring at predetermined points and extending above and parallel to said longitudinal borings, a narrow channel connecting parallel pairs of said longitudinal passages and said longitudinal borings, a conduit leading from one end of each of said longitudinal borings to braking means, and valve means in each of said longitudinal borings including; a piston moveable with said longitudinal boring, said piston including a first U-shaped cup, a spacer of the same circumferential shape of said longitudinal boring and a second U-shaped cup, adjustment means for said piston including a pin abutting said first U-shaped cup, spring means within said longitudinal boring, one end of said spring means abutting said piston and locking means, said locking means including a circumferential groove on said piston and ball means maintained at a predetermined point along the periphery of said longitudinal boring adapted to lock said piston at said conduit end of said longitudial boring upon damage to said conduit.

2. A safety valve system for use with a hydraulic system as claimed in claim 1 wherein fluid loading channels are provided in said block adapted to intersect each of said longitudinal passages.

3. A safety valve system for use with a hydraulic system as claimed in claim 2 wherein a bumper is affixed to one end of said spring adapted to butt said second U-shaped cup.

4. A safety valve system for use with a hydraulic system as claimed in claim 3 wherein additional conduits are provided at the end of said longitudinal boring, said additional conduits leading to separate braking means.

References Cited

UNITED STATES PATENTS 2,056,940  10/1936  Francis et al. _____ 60—54.5

FOREIGN PATENTS 1,116,950  2/1956  France.

MARTIN P. SCHWADRON, *Primary Examiner.*

R. R. BUNEVICH, *Assistant Examiner.*